(12) United States Patent
Ma et al.

(10) Patent No.: US 11,572,925 B2
(45) Date of Patent: Feb. 7, 2023

(54) BRAKE SLACK ADJUSTER HAVING SENSING PISTON WITH ORIFICE AND SYSTEMS, COMPONENTS, AND METHODS THEREOF

(71) Applicant: Caterpillar Inc., Peoria, IL (US)

(72) Inventors: Pengfei Ma, Naperville, IL (US); Puning Wei, Naperville, IL (US); Aleksander Gust, Naperville, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/231,039

(22) Filed: Apr. 15, 2021

(65) Prior Publication Data

US 2022/0333658 A1 Oct. 20, 2022

(51) Int. Cl.
*F16D 65/76* (2006.01)
*B60T 13/12* (2006.01)

(52) U.S. Cl.
CPC ............. *F16D 65/76* (2013.01); *B60T 13/12* (2013.01)

(58) Field of Classification Search
CPC ................................ F16D 65/76; B60T 13/12
USPC ...................................................... 188/196 A
See application file for complete search history.

(56) References Cited

U.S. PATENT DOCUMENTS

| | | | |
|---|---|---|---|
| 2,544,849 A | 3/1951 | Martin | |
| 2,835,111 A | 5/1958 | Oswalt | |
| 2,918,797 A * | 12/1959 | Oswalt | F16D 65/74 60/590 |
| 2,923,132 A * | 2/1960 | Oswalt | F16D 65/74 60/590 |
| 2,926,499 A * | 3/1960 | Oswalt | B60T 13/245 60/590 |
| 2,954,673 A * | 10/1960 | Oswalt | B60T 11/10 60/590 |
| 2,972,865 A * | 2/1961 | Orshansky, Jr. | F16D 65/74 188/196 R |
| 2,972,866 A | 2/1961 | Oswalt | |
| 3,837,443 A | 9/1974 | Clemmons et al. | |
| 3,890,786 A | 6/1975 | Engle | |
| 3,924,902 A | 12/1975 | Engle | |
| 3,955,370 A * | 5/1976 | Engle | F16D 65/74 60/590 |
| 5,685,399 A * | 11/1997 | Butler | B60T 13/22 188/196 A |

(Continued)

FOREIGN PATENT DOCUMENTS

DE 3838223 A1 5/1990

OTHER PUBLICATIONS

International Search Report and Written Opinion for Int'l. patent appln. No. PCT/US2022/022134, dated Jul. 14, 2022 (14 pgs.).

*Primary Examiner* — Robert A. Siconolfi
*Assistant Examiner* — San M Aung
(74) *Attorney, Agent, or Firm* — Xsensus LLP

(57) ABSTRACT

A slack adjuster assembly and systems, components, and methods can comprise a sensing piston assembly that includes a housing, a piston slidably provided in the housing, and a biasing member provided in the housing. The biasing member can be configured to bias the piston away from an end wall of the housing. The piston can have an end wall opposite the end wall of the housing, where the end wall of the piston can have at least one orifice that extends from a first side of the end wall of the piston to a second side of the end wall of the piston.

20 Claims, 3 Drawing Sheets

(56) References Cited

U.S. PATENT DOCUMENTS

| | | |
|---|---|---|
| 9,593,729 B2 | 3/2017 | Nolke et al. |
| 2012/0193176 A1 | 8/2012 | Knowles |

* cited by examiner

BRAKE SLACK ADJUSTER HAVING SENSING PISTON WITH ORIFICE AND SYSTEMS, COMPONENTS, AND METHODS THEREOF

TECHNICAL FIELD

The present disclosure relates to slack adjusters for mechanical brake systems, and more particularly to a brake slack adjuster having a sensing piston with an orifice, and systems, components, and methods thereof.

BACKGROUND

A sensing piston seal of a brake slack adjuster may degrade after running. The degradation may allow air that would overwise be sealed in an enclosure of the sensing piston to escape and/or allow brake fluid from outside the enclosure to enter into the enclosure. Such leakage may lead to hydraulic locking.

U.S. Pat. No. 3,890,786 ("the '786 patent") describes a pneumatic to hydraulic converter for a hydraulically operated brake system having a first fluid motor, a spring applied fluid released motor means, and a master hydraulic cylinder. The '786 patent also describes altering the amount of hydraulic fluid returned to working space and reservoir, where when shoe clearance initially is too great, the quantity of oil discharged from chamber during the application will necessarily be greater than the quantity returned when the brakes are subsequently released, and during the release, the slack adjuster piston 110 will return to its initial position in contact with abutment means 171 before the hydraulic piston means 44 had reached its retracted position. According to the '786 patent, in this situation, oil will be transferred from a working space through an inclined passageway, and a check valve to another working space to ensure that hydraulic piston will return to its retracted position.

SUMMARY

According to an aspect a slack adjuster assembly is disclosed or provided. The slack adjuster assembly can comprise a sensing piston assembly including: a housing, a piston slidably provided in the housing, and a biasing member provided in the housing, the biasing member being configured to bias the piston away from an end wall of the housing. The piston can have an end wall opposite the end wall of the housing, where the end wall of the piston can have at least one orifice that extends from a first side of the end wall of the piston to a second side of the end wall of the piston.

In another aspect, a method is disclosed or implemented. The method can comprise: providing a slack adjuster assembly having an inlet port to receive brake fluid from a brake fluid source and an outlet port to selectively pass the brake fluid to control braking of a wheel of a vehicle; and providing the brake fluid within the slack adjuster assembly. The slack adjuster assembly can include: an enclosure defining an internal chamber, a floating piston assembly in the internal chamber between the inlet port and the outlet port, and a sensing piston assembly in the internal chamber between the inlet port and the outlet port. The sensing piston assembly can include a housing, at least one spring provided in the housing, and a piston slidably provided in the housing and biased by the at least one spring. The piston can have an end wall that intersects a longitudinal axis of the slack adjuster assembly, where the end wall of the piston can have an orifice. Said providing the brake fluid can provide the brake fluid to both sides of the end wall of the piston, including inside the housing between an end wall of the housing and the piston.

And in another aspect a braking system for a vehicle is disclosed or provided. The braking system can comprise: a hydraulic fluid source adapted to control supply of hydraulic fluid responsive to a braking input; and a slack adjuster having an inlet port to receive the hydraulic fluid from the hydraulic fluid source and an outlet port to selectively pass the hydraulic fluid to control braking of a wheel of the vehicle. The slack adjuster can include: an enclosure defining an internal chamber, a floating piston assembly in the internal chamber between the inlet port and the outlet port, and a sensing piston assembly in the internal chamber between the inlet port and the outlet port. The sensing piston assembly can be operable as a fluid replenishing valve and can include a housing, at least one spring provided in the housing, and a piston slidably provided in the housing and operatively interfacing with the at least one spring. The piston can have an end wall opposite an end wall of the housing, where the end wall of the piston can have at least one opening such that the hydraulic fluid is able to be provided on both sides of the piston.

Other features and aspects of this disclosure will be apparent from the following description and the accompanying drawings.

DETAILED DESCRIPTION

The present disclosure relates to slack adjusters for mechanical brake systems, and more particularly to a brake slack adjuster having a sensing piston with an orifice, and systems, components, and methods thereof.

Figure 1:
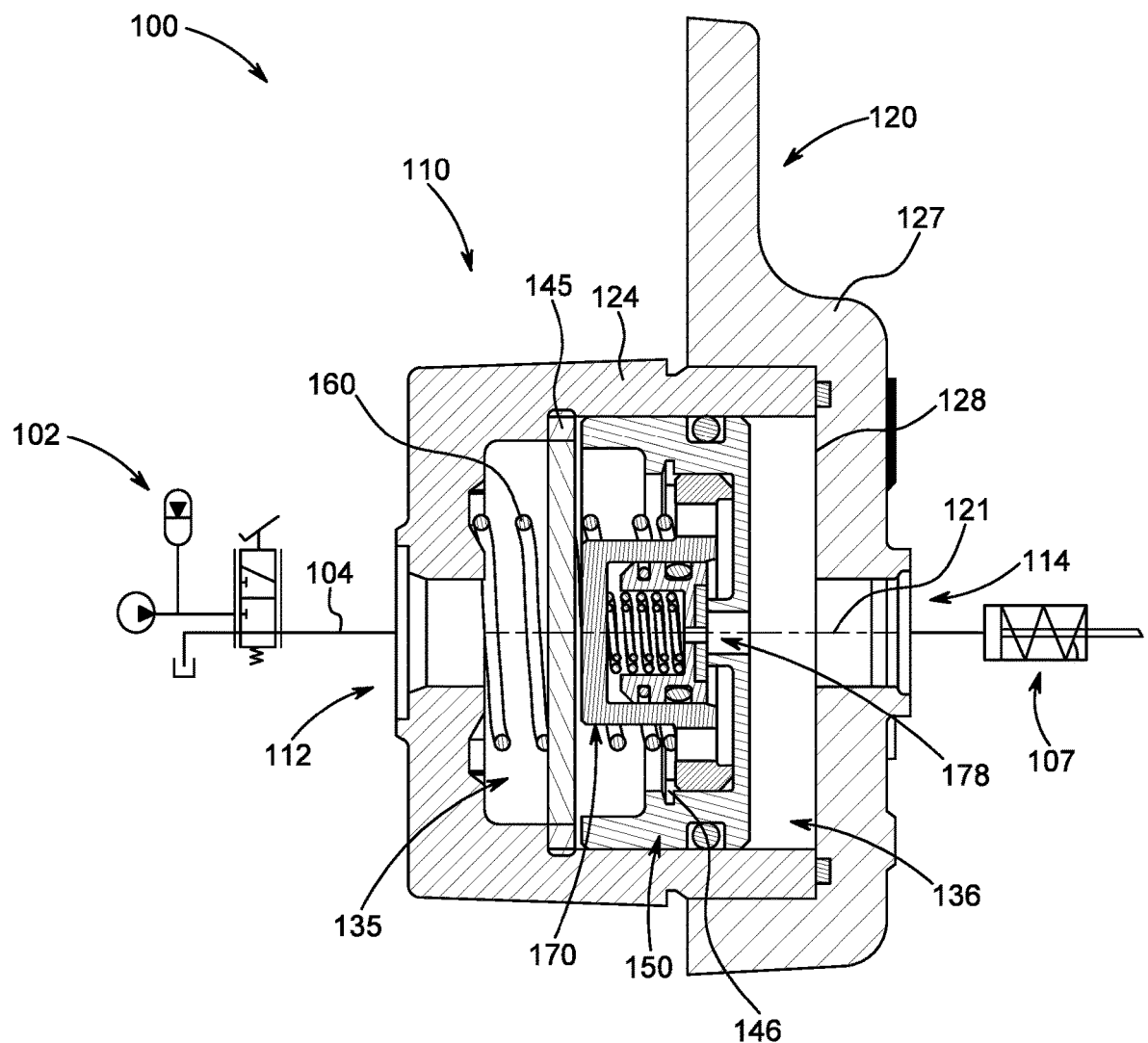
FIG. 1 is a diagram of a braking system including a slack adjuster according to one or more embodiments of the disclosed subject matter.

Referring to FIG. 1, a braking system 100 of a vehicle according to embodiments of the disclosed subject matter can have a slack adjuster 110. The slack adjuster 110 or portions thereof may be referred to herein as a slack adjuster assembly. The braking system 100 can also have a brake fluid source 102 to provide brake fluid, also known as hydraulic fluid, to the slack adjuster 110, and a brake assembly 107 to process brake fluid relative to the slack adjuster 110.

Generally, the brake fluid source 102 may include a pump, an accumulator, and a brake valve or the like to selectively provide brake fluid (from a reservoir) to the slack adjuster 110 via a brake line 104. The brake fluid can be pressurized and provided responsive to a braking input (e.g., depression or not of a brake pedal of the vehicle).

FIG. 1 presents the brake assembly 107 in the form of a hydraulically actuated spring release brake having an actuator, though brake assemblies according to embodiments of the disclosed subject matter are not limited by the specific representation shown in FIG. 1. The brake assembly 107 can be disk- or drum-based braking assembly to control braking of a corresponding wheel of the vehicle. Though the slack adjuster 110 shown in FIG. 1 is a single-brake slack adjuster, embodiments of the disclosed subject matter are not so limited. Thus, slack adjusters according to embodiments of the disclosed subject matter may be so-called dual-brake slack adjusters configured to be operatively coupled to brake assemblies 107 for different wheels of the vehicle (see e.g., FIG. 3).

In general, the braking control of the brake assembly 107 can be based on the input and output and flow direction of the brake fluid relative to the slack adjuster 110. In this regard, the slack adjuster 110 can selectively pass (i.e., output or not) the brake fluid to the brake assembly 107 to control braking operation of the brake assembly 107. Likewise, the slack adjuster 110 can receive brake fluid from the brake assembly 107. This may be referred to as backflow and may occur upon a decrease in braking command (including releasing the brakes entirely).

The slack adjuster 110 can have an inlet port 112 and an outlet port 114. The inlet port 112 can receive brake fluid from the brake line 104 and the outlet port 114 can pass brake fluid to and from the brake assembly 107. In that brake fluid may be intermittently output from the outlet port 114, or in that the flow direction of the brake fluid may change, the processing of the brake fluid at the outlet port 114 can be characterized as selective.

The slack adjuster 110 can include an enclosure 120, which may also be referred to or characterized as a housing. The enclosure 120 can define or otherwise include the inlet port 112 and the outlet port 114. According to one or more embodiments, the enclosure 120 can be comprised of a base 124 and an end cap 127. As shown in FIG. 1, the end cap 127 can have or otherwise define the outlet port 114 and the base 124 can have or otherwise define the inlet port 112. Optionally, base 124 can threadedly receive the end cap 127. That is, the end cap 127 can be coupled to the base 124 via threading. Such coupling may form a seal to prevent brake fluid from exiting the slack adjuster 110 via these interfaces.

The enclosure 120 can also define or otherwise include an internal chamber that extends along an axis 121 of the enclosure 120. The axis 121 may be referred to herein or characterized as a central axis, a longitudinal axis, or a central longitudinal axis. Moreover, the axis 121 may be characterized as a longitudinal axis of the slack adjuster 110 and/or of the enclosure 120. In this regard, the inlet port 112 and/or the outlet port 114 may be coaxial with the axis 121.

Discussed in more detail below, the internal chamber may have or otherwise be characterized as having an inlet chamber 135 and an outlet chamber 136. Generally, the inlet chamber 135 can be associated with the inlet port 112 and the outlet chamber 136 can be associated with the outlet port 114. Also discussed in more detail below, each of the inlet chamber 135 and the outlet chamber 136 may be of variable volume depending upon the state of operation of the slack adjuster 110.

The slack adjuster 110 can include a floating piston assembly 150 and a sensing piston assembly 170. The floating piston assembly 150 and sensing piston assembly 170, together, may be referred to as a set of floating piston and sensing piston assemblies. Generally, the inlet chamber 135 can be between the inlet port 112 and each of the floating piston assembly 150 and the sensing piston assembly 170, and the outlet chamber 136, when present depending upon the location of the floating piston assembly 150, can be between the outlet port 114 and at least the sensing piston assembly 170. The outlet chamber 136 may be present when the sensing piston assembly 170 is not abutting an end wall 128 of the end cap 127.

Figure 3:
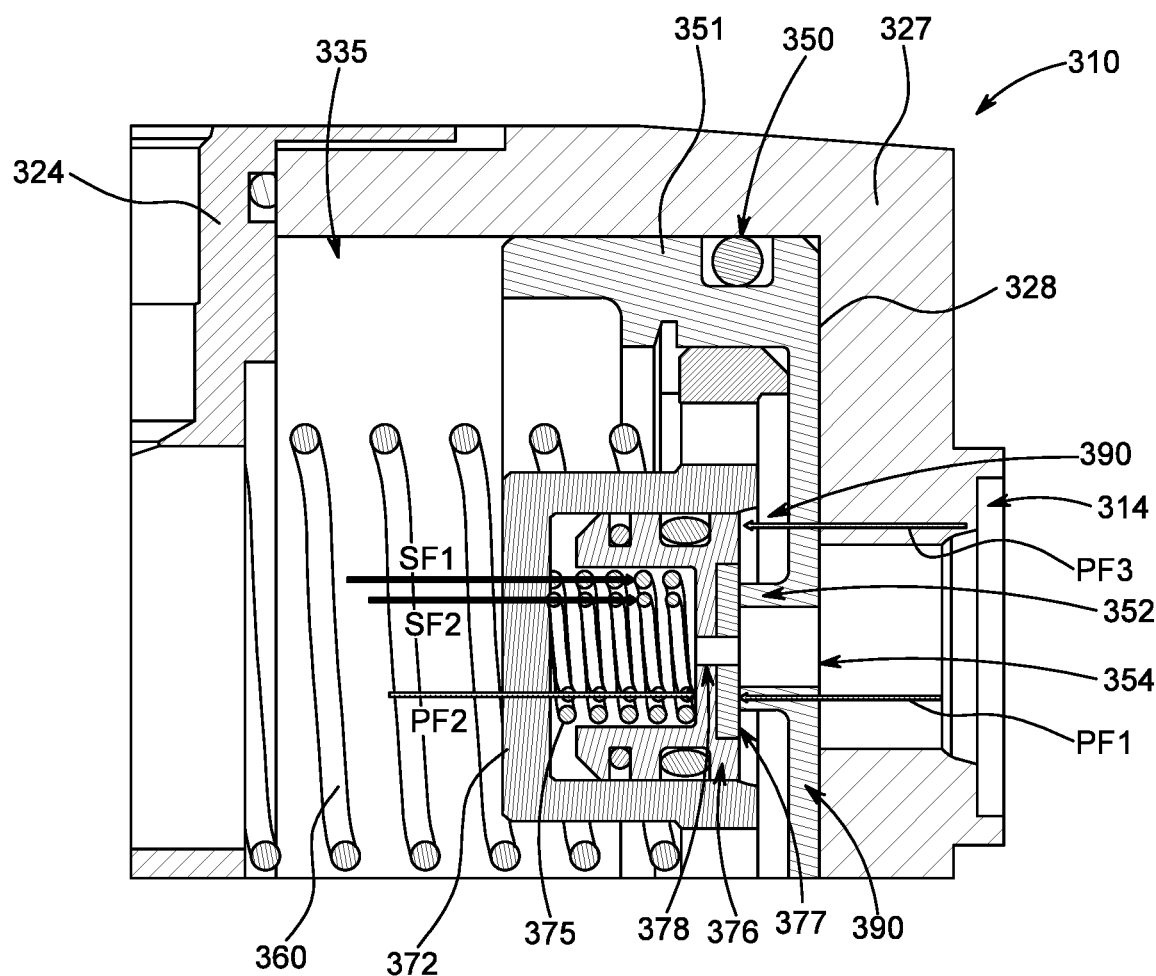
FIG. 3 is a sectional view showing forces acting on slack adjusters according to one or more embodiments of the disclosed subject matter.

The floating piston assembly 150 can be accommodated in the internal chamber formed by the enclosure 120 so as to be movable from a first position to a second position and vice versa. More specifically, the floating piston assembly 150 can be slidingly provided in the internal chamber formed by the enclosure 120 so as to be movable along the axis 121. Hence, the floating piston assembly 150 can be caused to slide from the first position to the second position and vice versa. The first and second positions may be referred to as or indicative of different operational states of the slack adjuster 110. FIG. 1 shows the floating piston assembly 150 in a second position according to one or more embodiments of the disclosed subject matter, whereas FIG. 3 shows a first position according to one or more embodiments of the disclosed subject matter.

Figure 2:
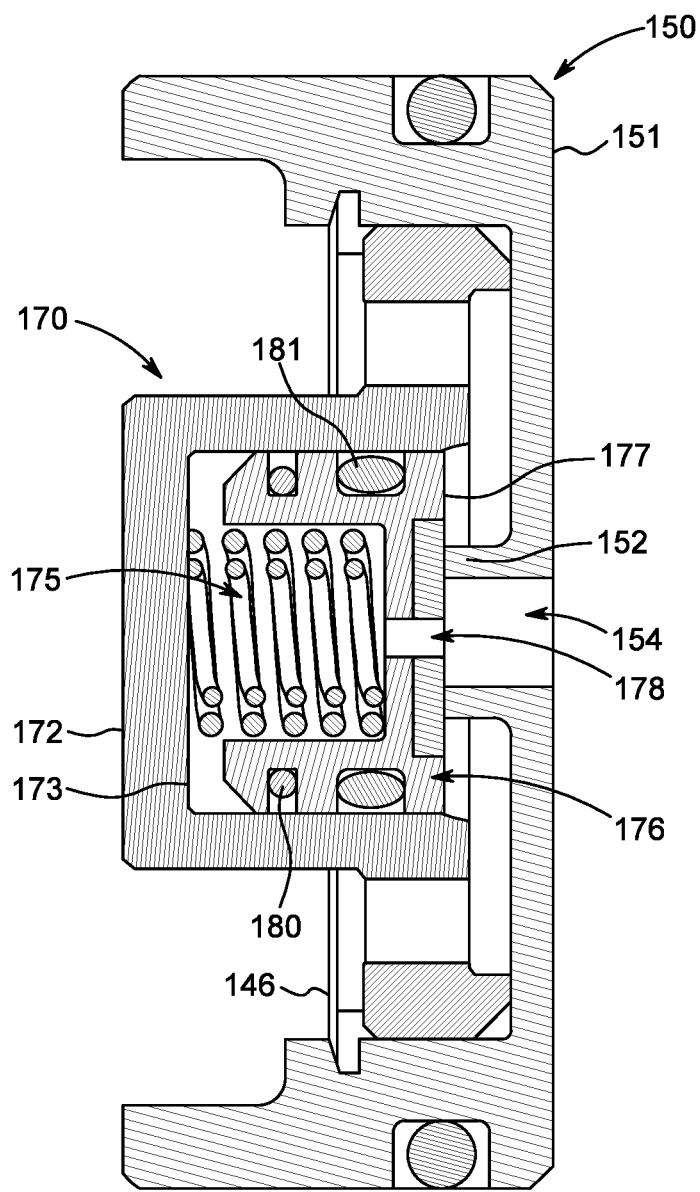
FIG. 2 is a sectional view of a portion of the slack adjuster of FIG. 1.

The sensing piston assembly 170 can be associated with the floating piston assembly 150 and provided in the inlet chamber 135, for instance, between the floating piston assembly 150 and the inlet port 112. Referring to FIG. 1 and FIG. 2, the sensing piston assembly 170 may be provided on or otherwise interface with the floating piston assembly 150. According to one or more embodiments, the sensing piston assembly 170 can be supported by the floating piston assembly 150 such that the two can move in unison, for instance, from the first position to the second position of the floating piston assembly 150 and vice versa within the internal chamber or cavity. For example, the sensing piston assembly 170 and the floating piston assembly 150 can be fixed to each other using a snap ring 140 or the like. A spacer 145 may also be provided between the floating piston assembly 150 and the sensing piston assembly 170 and the inlet port 112, such as shown in FIG. 1.

A biasing element or member, for instance, a spring 160 (e.g., coil spring), can be provided to bias the floating piston assembly 150 toward the outlet port 114. The spring 160, which may be provided around a portion of the sensing piston assembly 170 (e.g., a housing or cage) may abut the base 124, such as shown in FIG. 1. Optionally, the spring 160 may be considered part of the floating piston assembly 150. In that the floating piston assembly 150 and the sensing piston assembly 170 can move in unison, the spring 160 can thus also bias the sensing piston assembly 170. The spring 160 may be referred to or characterized as a floating piston spring.

The sensing piston assembly 170 can include a housing or cage 172 and a piston 176. Optionally, the sensing piston assembly 170 can include a biasing member or element 175. The biasing member 175 can be provided in the housing 172, as can the piston 176, such as shown in FIG. 2. The biasing member 175 can abut an end wall 173 of the housing 172 and optionally abut an end wall 177 of the piston 176. The sensing piston assembly 170, like the floating piston assembly 150, can be provided around or coaxial with the axis 121. Hence, the end wall 177 of the piston 176 may intersect the axis 121 and, moreover, may be centrally aligned or coaxial with the axis 121.

The biasing member 175 may be or include one or more springs, for instance, one or more coil springs. FIG. 1 and FIG. 2, for instance, show the biasing member 175 as being a nested spring pack comprised of a plurality (e.g., two) coil springs. According to one or more embodiments, a spring rate of the biasing member 175 may be in a range of 5 to 20 N/mm inclusive and/or a spring pre-load force of the of the biasing member 175 may be in a range of 5 to 20 N/mm inclusive.

The piston 176 can be slidably provided so as to slide within the housing 172 from a first position to a second position (shown in FIG. 2) along the axis 121. The piston 176 may operatively interface with the biasing member 175, for instance, such that the biasing member 175 biases the piston 176 toward the outlet port 114 and away from the end wall 173 of the housing 172. Discussed in more detail below, the piston 176, particularly the end wall 177 thereof, which may be operable as a fluid replenishing valve, may be biased against a wall 152 of a piston 151 of the floating piston assembly 150 that forms a passageway 154. The passageway 154 may be referred to or characterized as a central passageway in that the passageway 154 may be provided on or coaxial with the axis 121.

The end wall 177 of the piston 176 of the sensing piston assembly 170 can have one or more orifices or openings 178 that extend entirely through the end wall 177 from a first side thereof to a second side thereof. According to one or more embodiments, the opening 178 can be a single opening (i.e., the only opening in the end wall 177), for instance, provided centrally at the axis 121. Alternatively, a plurality of openings 178 may be provided, for instance, spaced symmetrically relative to the axis 121. The arrangement of plural openings 178 may be such that one opening 178 is at the axis 121 and multiple openings 178 are provided symmetrically around the central opening 178. Alternatively, no central opening may be provided but the openings 178 may still be provided symmetrically around the axis 121. Optionally, in the case of multiple openings, the openings 178 can be all the same size (e.g., shape and/or area) or different sizes (e.g., shape and/or area).

Each opening 178 may be circular in an end view thereof, though embodiments of the disclosed subject matter are not so limited. According to one or more embodiments, the single opening 178 may have a diameter in a range of 1.3 mm to 2.0 mm inclusive. In the case of multiple openings 178, the total diameters of the openings 178 can be in the range of 1.3 mm to 2.0 mm inclusive.

In that the one or more openings 178 can extend entirely through the end wall 177 of the piston 176 of the sensing piston assembly 170, brake fluid may be provided on both sides of the piston 176. That is, brake fluid may be provided inside the housing 172 of the sensing piston assembly 170, between the end wall 173 of the housing 172 and the piston 176, as well as on the other side of the piston 176. Thus, sealed air may not be provided inside the housing 172 of the sensing piston 170 (i.e., between the end wall 173 of the housing 172 and the piston 176). Moreover, though FIG. 1 and FIG. 2 show that sealing member 180 and sealing member 181, each of which may be sealing rings (e.g., O-rings), according to one or more embodiments of the disclosed subject matter one or both of the sealing member 180 and the sealing member 181 may be omitted. Indeed, optionally, the sensing piston assembly 170 may be free or not have any sealing members (e.g., sealing rings) between the piston 176 and the housing 172. Accordingly, in that the sensing piston assembly 170 may not seal air between the piston 176 and the housing 172 due to the one or more openings 178 that can allow brake fluid on both sides of the piston 176, the sensing piston assembly 170 may be referred to or characterized as unsealed.

INDUSTRIAL APPLICABILITY

As noted above, the present disclosure relates to slack adjusters for mechanical brake systems, and more particularly to a brake slack adjuster having a sensing piston with an orifice, and systems, assemblies, components, and methods thereof.

Slack adjusters according to embodiments of the disclosed subject matter, such as slack adjuster 110, in general, can utilize a differential piston principle to provide larger output flow to the brake assemblies, such as brake assembly 107, relative to the input flow of brake fluid from a brake fluid source, such as brake fluid source 102. Moreover, slack adjusters according to embodiments of the disclosed subject matter can be used to maintain a minimum clearance between stationary and rotating elements of the brake assembly 107.

For instance, slack adjusters according to embodiments of the disclosed subject matter can maintain sufficient brake operation speed via compensation of the brake disk worn through time by controlling the disk running clearance using the volume of brake fluid in the outlet chamber 136. That is, as the brake disk wears the volume of brake fluid in the chamber of the brake assembly 107 can increase to compensate for the wear and keep the disk running clearance close to non-wear condition. The additional volume of brake fluid can come from the slack adjuster 110 and can be trapped in the chamber of the brake assembly 107 when a fluid replenishing valve, such as according to operation of the piston 176 of the sensing piston assembly 170, is closed and the floating piston assembly 150 (and the sensing piston assembly 170) is in the second position whereby the piston 151 of the floating piston assembly 150 is against the end wall 128 of the end cap 127.

Referring now to FIG. 3, this figure shows various forces that may act on slack adjusters according to embodiments of the disclosed subject matter. That is, according to embodiments of the disclosed subject matter, providing a slack adjuster 310 with one or more orifices in the end wall of the piston, such as one or more orifices 378 in FIG. 3 in the end wall 377 of the piston 376, can allow brake fluid to flow on either side of the sensing piston, particularly piston 376 in FIG. 3, and thus generate new force(s).

For instance, FIG. 3 shows forces PF1, PF2, PF3, SF1, and SF2 (shown diagrammatically as force vectors). Here, PF1 can represent service brake pressure acting on the area annulus (i.e., opening(s) 378) and PF2 can represent service brake pressure now acting on the other side of the piston 376 (this pressure can act on the biasing member 375 side area annulus (i.e., opening(s) 378), where the force generated can keep the piston 376 seated (against the piston 351 of the floating piston assembly 350). In the case of the biasing member 375 being provided, in this example in the form of a nested spring pack having two springs, the forces SF1 and SF2 can represent spring forces that can act to keep the piston 376 seated (against the piston 351 of the floating piston assembly 350). In the case of only one spring or the like for the biasing member 375, a spring rate equivalent to the two shown in FIG. 3 may be implemented. PF3 can represent brake relay pressure that can act on the outer-side area annulus (i.e., opening(s) 378) of the piston 376 as a force to unseat the piston 376 (from against the piston 351 of the floating piston assembly 350). Hence, the piston 376 may be moved to and from a position against a wall 352 of the piston 351 of the floating piston assembly 350 that forms a passageway 354. Movement of the piston 376 can thus open and close direct access to the passageway 354 from the pathway formed between the floating piston assembly 350 and the sensing piston assembly 370 (e.g., where PF3 is shown in FIG. 3).

Regarding operation of slack adjusters more generally according to embodiments of the disclosed subject matter, the following table may be representative.

| | Floating piston assembly 150/350 | Braking status | Replenishing Valve 176/376 | Pressure in inlet chamber 135/335 | Pressure in outlet chamber 136 | |
|---|---|---|---|---|---|---|
| 1 | At base 124/324 | No braking, keep disk running clearance | Closed | Very low | Residual pressure | |
| 2 | At end wall 128/328 | Not fully applied braking | Open | Low to medium | >Residual pressure | Close when pressures of inlet and outlet chambers are equalized |
| 3 | At end wall 128/328 | Fully applied braking | Open | High | High | Inlet and outlet chambers can communicate. Close when pressures of inlet and outlet chambers are equalized |
| 4 | At base 124/324 | No braking, keep disk running clearance | Closed | Very low | Residual pressure | |

Regarding operation, generally, and with reference to the table above, the brake fluid can enter the inlet port 112/312 and act on working areas/surfaces of the sensing piston assembly 170/370 such that the sensing piston assembly 170/370 and the floating piston assembly 150/350 are pushed toward the outlet port 114/314 and eventually to the second position of the floating piston assembly 150/350, such as shown in FIG. 3. As shown, in the second position, the floating piston assembly 150/350 can abut an end wall 128/328 of the end cap 127/327. Movement to the position shown in FIG. 3 can push brake fluid between the floating piston assembly 150/350 and the outlet port 114/314, i.e., in the outlet chamber 136, to the braking assembly 107.

Brake fluid can flow through the sensing piston assembly 170/370 via one or more passageways 390. However, this brake fluid may be prevented from proceeding to the passageway 154/354 of the floating piston assembly 150/350 and on to the outlet port 114/314 due to closure of the piston 176/376 of the sensing piston assembly 170/370.

The piston 176/376, which may be normally closed, can be caused to open when the pressure of the brake fluid increases high enough to move the piston 176/376 such that the piston 176/376 moves and opens as a so-called valve (fluid replenishing valve). More specifically, the piston 176/376 can open due to hydraulic force of the brake fluid acting on the piston 176/376 overcoming the mechanical force of the biasing member 175/375 behind the piston 176/376 of the sensing piston assembly 170/370. Here, notably, brake fluid can be provided on both sides of the piston 176/376, as noted above. Thus, the hydraulic force PF1 and the hydraulic force PF3 can overcome the force PF2 from the brake fluid between the piston 176/376 and the housing 172/372, as well as the force(s) associated with the biasing member 175/375, in this example, forces SF1 and SF2. The brake fluid can then proceed from the passage 390 between the sensing piston assembly 170/370 and the floating piston assembly 150/350 through the passageway 154/354 in the floating piston assembly 150/350 to and through the outlet port 114/314 and on to the brake assembly 107.

When the braking input is stopped (e.g., brake pedal released), the slack adjuster 110/310 can revert to the position shown in FIG. 1. Such state can correspond to scenario 1/4 in the table above. Here, the piston 176/376 can be closed and the floating piston assembly 150/350 (and the sensing piston assembly 170/370) can be in the first position, thereby trapping the same volume of brake fluid from the slack adjuster 110/310 in the chamber of the brake assembly 107 regardless of brake wear. FIG. 1 may also correspond to scenario 1/4 in the table above.

Where there is no braking, brake fluid from the braking assembly 107 can be provided to the outlet port 114/314 of the slack adjuster 110/310. Though this brake fluid can be under relatively high pressure (compared to the brake fluid in the inlet chamber 135/335), the pressure may not be sufficient to open the piston 176/376. However, with the piston 176/376 closed, the pressure can be sufficient to move the floating piston assembly 150/350 and the sensing piston assembly 170/370 inward toward the base 124/324 to the first position of the floating piston assembly 150/350, such as shown in FIG. 1. The position shown in FIG. 1 can correspond to scenario 1/4 in the table above.

The spring 160/360 associated with the combined movement of the floating piston assembly 150/350 and the sensing piston assembly 170/370 can provide relatively less resistance to the brake fluid coming from the outlet port 114/314 as compared to the resistance provided by the biasing member 175/375 of the sensing piston assembly 170/370. Thus, with the brake input disengaged, the back pressure of the brake fluid on the brake side of the slack adjuster 110/310, produced by the service brake return springs, can keep the floating piston assembly 150/350 retracted.

Regarding sizing of the opening and characteristics of the biasing member 175/375, as noted above, a diameter of the opening(s) 178/378 can be in a range of 1.3 mm to 2.0 mm inclusive, a spring rate of the biasing member 175/375 may be in a range of 5 to 20 N/mm inclusive, and/or a spring pre-load force of the of the biasing member 175/375 may be in a range of 5 to 20 N/mm inclusive.

According to one or more embodiments, the opening sizing and biasing characteristics may be set based on each other. That is, the orifice area, the spring rate, and the spring pre-load force may be optimized to match a desired sense piston trajectory (spatial displacement travel and/or timing of travel). In some cases, too small an opening area of the orifice(s) 378 and/or too strong the spring force of the biasing member 375 can prevent the piston 376 from fully opening at all or within a predetermined amount of time due to flowrate restrictions through the orifice(s) 378 and biasing force that is too great (and hence too small a pressure differential on the piston 376), respectively.

Thus, as an example, embodiments of the disclosed subject matter can involve a slack adjustment of a service piston associated with a braking system of a work machine. The service piston can include a sensing piston disposed therein. The sensing piston can include an orifice (e.g., d=1.5 mm) disposed on a top/end surface of the sensing piston. The orifice can adjust slacking between the service piston and discs of the braking system by draining accumulated oil out of a sensing piston chamber.

By providing one or more orifices or openings in an end wall of a sensing piston as described herein, brake fluid can be provided on both sides of the sensing piston. This provision can prevent or minimize hydraulic locking of the sensing piston assembly (i.e., where the sensing piston becomes inhibited from moving fully open and thus may prevent or minimize pressure within the brake from releasing), because brake fluid provided on both sides of the sensing piston can flow through (i.e., drain) the one or more orifices in the end wall of the sensing piston. Embodiments of the disclosed subject matter, therefore, may not suffer from the problem of a sealed sensing piston assembly leaking air from within its housing and thus allowing brake fluid to enter the sensing piston housing. In that pressure from the braking can be reliably released (i.e., brakes do not always have pressure applied), overheating of the brakes can be prevented or minimized. Such configuration may also allow the provisional of omitting sealing members (e.g., sealing rings such as o-rings) between the sensing piston and the sensing piston housing.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. A braking system for a vehicle comprising:
   a hydraulic fluid source adapted to control supply of hydraulic fluid responsive to a braking input; and
   a slack adjuster having an inlet port to receive the hydraulic fluid from the hydraulic fluid source and an outlet port to selectively pass the hydraulic fluid to control braking of a wheel of the vehicle, the slack adjuster including:
      an enclosure defining an internal chamber,
      a floating piston assembly in the internal chamber between the inlet port and the outlet port, and
      a sensing piston assembly in the internal chamber between the inlet port and the outlet port,
   wherein the sensing piston assembly is operable as a fluid replenishing valve and includes a housing, at least one spring provided in the housing, and a piston slidably provided in the housing and operatively interfacing with the at least one spring,
   wherein the piston has an end wall opposite an end wall of the housing, the end wall of the piston having at least one opening such that the hydraulic fluid is able to be provided on both sides of the piston,
   wherein the end wall of the housing extends continuously in a direction perpendicular to a longitudinal axis of the enclosure from a first side of the housing to a second side of the housing opposite the first side in a side cross-sectional view of the slack adjuster, and
   wherein the end wall of the piston of the sensing piston assembly that has the at least one opening is at all times closer to the outlet port than the end wall of the housing of the sensing piston assembly is to the outlet port.

2. The braking system according to claim 1, wherein the sensing piston assembly is without any sealing rings between the piston and the housing.

3. The braking system according to claim 1, wherein the at least one opening consists of a single opening centrally located at a central longitudinal axis that runs through the end wall of the piston.

4. The braking system according to claim 3, wherein the single opening has a diameter in a range of 1.3 mm to 2.0 mm inclusive.

5. The braking system according to claim 1, wherein the at least one opening includes a plurality of openings spaced symmetrically relative to a central longitudinal axis that runs through the end wall of the piston.

6. The braking system according to claim 5, wherein a total diameter of the plurality of openings is in a range of 1.3 mm to 2.0 mm inclusive, wherein respective diameters of the openings are a same value.

7. The braking system according to claim 1, wherein a spring rate of the at least one spring is in a range of 5 to 20 N/mm inclusive and/or a spring pre-load force of the at least one spring is in a range of 5 to 20 N/mm inclusive.

8. The braking system according to claim 1, wherein the piston is slidably provided in the housing such that the end wall of the piston is moveable to and from a position abutting a wall of the floating position assembly that defines a central passageway through the floating piston assembly located at a central longitudinal axis that runs through the end wall of the piston and the central passageway.

9. The braking system according to claim 1, wherein the spring is a nested spring pack comprised of a plurality of coil springs.

10. The braking system according to claim 1, wherein the slack adjuster is a dual slack adjuster having said outlet port to selectively pass the hydraulic fluid to control braking of the wheel of the vehicle, another outlet port to selectively pass the hydraulic fluid to control braking of another wheel of the vehicle, and another floating piston assembly and sensing piston assembly pair associated with said another outlet port.

11. A method comprising:
    providing a slack adjuster assembly having an inlet port to receive brake fluid from a brake fluid source and an outlet port to selectively pass the brake fluid to control braking of a wheel of a vehicle; and
    providing the brake fluid within the slack adjuster assembly,
    wherein the slack adjuster assembly includes:
       an enclosure defining an internal chamber,
       a floating piston assembly in the internal chamber between the inlet port and the outlet port, and
       a sensing piston assembly in the internal chamber between the inlet port and the outlet port,
    wherein the sensing piston assembly includes a housing, at least one spring provided in the housing, and a piston slidably provided in the housing and biased by the at least one spring,
    wherein the piston has an end wall that intersects a longitudinal axis of the slack adjuster assembly, the end wall of the piston having an orifice,
    wherein said providing the brake fluid provides the brake fluid to both sides of the end wall of the piston, including inside the housing between an end wall of the housing and the piston,
    wherein said providing the brake fluid causes the piston of the sensing piston assembly to move to and/or from the position blocking a central passageway of the floating piston assembly that is located at the longitudinal axis of the slack adjuster assembly, and
    wherein the end wall having the orifice contacts a wall of a piston of the floating piston assembly when the piston of the sensing piston assembly blocks the central passageway and is spaced apart from the wall of the piston of the floating piston assembly when the piston of the sensing piston assembly has been moved from the position blocking the central passageway of the floating piston assembly.

12. The method according to claim 11,
wherein a diameter of the orifice is in a range of 1.3 mm to 2.0 mm inclusive, and
wherein a spring rate of the at least one spring is in a range of 5 to 20 N/mm inclusive and/or a spring pre-load force of the at least one spring is in a range of 5 to 20 N/mm inclusive.

13. The method according to claim 11, wherein said providing the slack adjuster assembly includes providing the slack adjuster without any sealing members between the piston and the housing of the sensing piston assembly.

14. A slack adjuster assembly comprising:
a floating piston assembly having a first end and a second end opposite the first end; and
a sensing piston assembly including:
 a housing,
 a piston slidably provided in the housing, and
 a biasing member provided in the housing, the biasing member being configured to bias the piston away from an end wall of the housing,
wherein the piston has an end wall opposite the end wall of the housing, the end wall of the piston having at least one orifice that extends from a first side of the end wall of the piston to a second side of the end wall of the piston,
wherein the sensing piston assembly is provided on and/or in the floating piston assembly,
wherein the sensing piston assembly has a first end and a second end opposite the first end,
wherein the first end of the sensing piston assembly is on a first end side of the floating piston assembly and the second end of the sensing piston assembly is on a second end side of the floating piston assembly, and
wherein the end wall of the piston having the at least one orifice is at the second end of the sensing piston assembly.

15. The slack adjuster assembly according to claim 14,
wherein a diameter of the at least one orifice is in a range of 1.3 mm to 2.0 mm inclusive, and/or
wherein a spring rate of the biasing member is in a range of 5 to 20 N/mm inclusive and/or a spring pre-load force of the biasing member is in a range of 5 to 20 N/mm inclusive.

16. The slack adjuster assembly according to claim 14, wherein the biasing member is a nested spring pack comprised of a plurality of coil springs.

17. The slack adjuster assembly according to claim 14, wherein the sensing piston assembly is free of any sealing rings between the piston and the housing.

18. The slack adjuster assembly according to claim 14, wherein the piston is configured to move to close and open a central passageway of the floating piston assembly that is located at the central axis common to the floating piston assembly and the sensing piston assembly.

19. The slack adjuster assembly according to claim 14, wherein the end wall of the piston of the sensing piston assembly is at all times farther from the end wall of the housing of the floating piston assembly than the biasing member is from the end wall of the housing of the floating piston assembly.

20. The slack adjuster assembly according to claim 14,
wherein the end wall of the housing of the floating piston assembly is free of any through holes, and
wherein the end wall of the housing of the sensing piston assembly extends in a direction of a central axis common to the floating piston assembly and the sensing piston assembly to no more than to even with the first end of the floating piston assembly.

* * * * *